US008719424B2

(12) United States Patent
Lu et al.

(10) Patent No.: US 8,719,424 B2
(45) Date of Patent: May 6, 2014

(54) TRANSMISSION METHOD AND SYSTEM FOR CONVERGED IP MESSAGING

(75) Inventors: Yan Lu, Shenzhen (CN); Man Xie, Shenzhen (CN)

(73) Assignee: ZTE Corporation, Shenzhen, Guangdon Province (CN)

( * ) Notice: Subject to any disclaimer, the term of this patent is extended or adjusted under 35 U.S.C. 154(b) by 64 days.

(21) Appl. No.: 13/383,915

(22) PCT Filed: May 18, 2010

(86) PCT No.: PCT/CN2010/072879
§ 371 (c)(1),
(2), (4) Date: Jan. 13, 2012

(87) PCT Pub. No.: WO2011/032390
PCT Pub. Date: Mar. 24, 2011

(65) Prior Publication Data
US 2012/0117177 A1    May 10, 2012

(30) Foreign Application Priority Data
Sep. 21, 2009    (CN) .......................... 2009 1 0190370

(51) Int. Cl.
*G06F 15/16*    (2006.01)
*H04L 12/66*    (2006.01)

(52) U.S. Cl.
USPC ........... 709/227; 709/248; 709/206; 370/352; 370/260

(58) Field of Classification Search
USPC ....................................... 709/227
See application file for complete search history.

(56) References Cited

U.S. PATENT DOCUMENTS

2009/0106455 A1*    4/2009    Xu et al. ...................... 709/248

(Continued)

FOREIGN PATENT DOCUMENTS

| CN | 101150531 A | 3/2008 |
|---|---|---|
| CN | 101207577 A | 6/2008 |
| CN | 101227418 A | 7/2008 |

OTHER PUBLICATIONS

English translation of International Search Report for PCT/CN2010/072879.
M. Handley, et al.: "SDP: Session Description Protocol"; Network Working Group; Jul. 2006; pp. 1-49.
B. Campbell, Ed., et al.: The Message Session Relay Protocol (MSRP); Network Working Group; Sep. 2007; pp. 1-63.

(Continued)

*Primary Examiner* — Emmanuel L Moise
*Assistant Examiner* — Mahran Abu Roumi
(74) *Attorney, Agent, or Firm* — McClure, Qualey & Rodack, LLP

(57) ABSTRACT

A transmission method and system for Converged IP Messaging (CPM) is disclosed, which can create Message Session Relay Protocol (MSRP) links between a CPM client and an originating participating function entity and between an Inter-Working Function entity (IWF) and the originating participating function entity respectively. The CPM client sends CPM message through each MSRP link to the inter-working function entity which sends the received CPM message to a non-CPM system after the protocol conversion of the CPM message. With the help of the method and system, the transmission link between the sender and the IWF is created by the session invite message of the large message mode CPM, and the content of the large message mode CPM is sent to the IWF which then transmits the content of the large message mode CPM to a non-CPM client of the receiver. The method and system resolves the problem that the content of the large message mode CPM can not be transmitted to a non-CPM system receiver in the prior art and improves the user experience.

14 Claims, 2 Drawing Sheets

(56) References Cited

U.S. PATENT DOCUMENTS

| | | | | |
|---|---|---|---|---|
| 2009/0279455 | A1* | 11/2009 | Wang et al. | 370/260 |
| 2010/0215036 | A1* | 8/2010 | Eom et al. | 370/352 |
| 2010/0325224 | A1* | 12/2010 | Pattan et al. | 709/206 |
| 2012/0042083 | A1* | 2/2012 | Ghazanfar et al. | 709/227 |

OTHER PUBLICATIONS

"OMS Converged IP Messaging System Description"; Draft Version 1.0; Open Mobile Alliance; Mar. 2009; pp. 1-113.

"Converged IP Messaging Architecture"; Draft Version 1.0; Open Mobile Alliance; Oct. 2007; pp. 1-37.

* cited by examiner

TRANSMISSION METHOD AND SYSTEM FOR CONVERGED IP MESSAGING

CROSS REFERENCE RELATED APPLICATIONS

This application is a national phase of PCT/CN2010/072879 filed May 18, 2010, which claims priority to China Application Serial No. 200910190370.5, filed Sep. 21, 2009, both of which are entirely incorporated herein by reference.

TECHNICAL FIELD

The present invention relates to mobile communication technology fields, and especially relates to a transmission method and system for Large Message Mode converged IP messaging.

BACKGROUND OF THE RELATED ART

CPM (Converged IP Messaging) was proposed by Open Mobile Architecture (OMA) in 2005, with the purpose of realizing the interworking of various message services, providing unified message services and perfect, unanimous and convenient message service experience. CPM converges various existing message services including Instant Message (IM), Push-To-Talk over Cellular (POC), Mobile E-mail (MEM), Short Messaging Service (SMS), Multimedia Messaging Service (MMS), and so on.

At present, CPM V1.0 specification is being enacted by OMA. The forms of CPM include: CPM message based on pager-mode, large message Mode CPM Message based on session-mode, other CPM session service based on session. Users need to register and login the CPM system—in other words, to be online—before using these services.

The pager-mode message is transmitted by Session Initiation Protocol (SIP) message between the CPM Clients of receiver and sender and the CPM system. If the size of message exceeds a threshold (e.g. 1300 bytes), the SIP message could not be used for carrying the pager-mode message when the sender need to send a large message mode CPM.

The CPM system has defined several main logical function entities: CPM Client, Participating Function (PF) entity, Controlling Function (CF) entity, Message Storage Server, Content Storage Server, Interworking Selection Function entity, Interworking Function entity, and so on.

The CPM system identifies a user uniquely with CPM address, according to architecture design idea of the CPM system, the CPM address belongs to different CPM participating function entities in terms of belonging relationship, the network environment where the participating function entity is located (including the SIP/IP core network where said participating function entity is located) is also called the home domain of the user to which the participating function entity belongs, on the basis of this idea, the above-mentioned several main services of CPM are controlled in signaling plane based on SIP protocol, therefore the signaling plane is through the participating function entities. For example, any CPM signaling sent out by a CPM client will be routed to the participating function entity to which the sender belongs—i.e. originating participating function entity—by the SIP/IP core network according to the address of the sender after coming into the CPM network environment, and be routed to the participating function entity to which the receiver belongs—i.e. destination end participating function entity—according to the address of the receiver. That is to say, the signaling call is initiated at the originating participating function entity and terminated at the destination end participating function in the environment of CPM system.

When a CPM user initiates a call to a group (e.g. sends a large message mode CPM message to a group, or initiates a conference call to a group), the signaling will be routed to a controlling function entity by the SIP/IP core network in terms of group address, the service controlling related to the group is performed by the controlling function entity, after the signaling plane reaches the originating participating function entity.

When the CPM system and non-CPM system interwork, the signaling will be routed to the interworking selection function entity by the SIP/IP core network finally, and the final interworking function entity will be selected by the interworking selection function entity.

In prior art, there is not a complete solution for sending large message mode CPMC message to a non-CPM system user. The CPM system user sends a large message invite message to a user that does not sign the CPM service, when the signal arrives at the originating function entity, the originating participating function entity sends the invite message to the interworking selection function entity according to some routing strategy since the destination end is not a CPM system user, that is to say, the interworking with the non-CPM system is triggered at the originating participating function entity.

SUMMARY OF THE INVENTION

The technical problem to be solved by the present invention is to provide a transmission method and system for large message mode CPM message, to solve the problem that CPM client cannot send large message mode CPM message to non-CPM system (SMS system, MMS system, Email system, for example) user in prior art.

In order to attain the above goal, the technological schemes of the present invention may be carried out as following:

A transmission method of converged IP messaging (CPM), creating message session relay protocol (MSRP) link between a CPM client and an originating participating function entity and between an interworking function entity and the originating participating function entity;

the CPM client sending CPM message to the interworking function entity through each MSRP link, the interworking function entity executing protocol conversion on the received CPM message to send to the non-CPM system.

The process for creating the MSRP link comprises: the creator of the MSRP link obtains the MSRP connection parameters of the opposite end through medium negotiation process SDP, said creator creates the MSRP link according to the MSRP connection parameters.

The SDP medium negotiation process comprises: the CPM client sending first session invite message which is then received by the originating participating function entity; the originating participating function entity sending second session invite message which is then received by an interworking selection function entity; the interworking selection function entity selecting an interworking function entity based on the second session invite message and sending third session invite message which is then received by the interworking function entity;

the interworking function entity sending third success response message, the third success response message being received by the interworking selection function entity; the interworking selection function entity sending second success response message, the second success response message being received by the originating participating function entity; the originating participating function entity sending first success response message, the first success response message being received by the sender CPM client.

The method further comprises:

the CPM client receiving the first response message and then sending first acknowledge message, the first acknowledge message being received by the originating participating function entity; the originating participating function entity receiving the first acknowledge message and then sending second acknowledge message, the second acknowledge message being received by the interworking selection function entity; the interworking selection function entity receiving the second acknowledge message and then sending third acknowledge message, the third acknowledge message being received through the interworking function entity; or the originating participating function entity receiving the second success response message and then sending the second acknowledge message, the second acknowledge message being received by the interworking selection function entity; the sender CPM client receiving the first success response message and then sending the first acknowledge message, the first acknowledge message being received by the originating participating function entity.

The MSRP connection parameters of the CPM client being carried in the first session invite message; the originating participating function entity creating a first MSRP link between the originating participating function entity and the sender CPM client according to the MSRP connection parameters; or the MSRP connection parameters of the CPM client being carried in the first success response message; the sender CPM client creating a first MSRP link between the CPM client and the originating participating function entity according to the MSRP connection parameters of the originating participating function entity.

The MSRP connection parameters of the originating participating function entity being carried in the second session invite message and the third session invite message; the interworking function entity creating a second MSRP link between the interworking function entity and the originating participating function entity according to the MSRP connection parameters; or the MSRP connection parameters of the interworking function entity being carried in the third success response message and the second success response message; the originating participating function entity creating a second MSRP link between the originating participating function entity and the interworking function entity according to the MSRP connection parameters.

The CPM client receiving the first success response message and then creating the first MSRP link when the creator of the first MSRP link is the CPM client;

the originating participating function entity receiving the first acknowledge message and then creating the first MSRP link when the creator of the first MSRP link is originating participating function entity.

When the creator of the second MSRP link is originating participating function entity, the originating participating function entity creating the second MSRP link after receiving the second success response message, or creating the second MSRP link after receiving the first acknowledge message, or creating the second MSRP link when receiving the MSRP medium transmission request;

the interworking function entity receiving the third acknowledge message and then creating the second MSRP link when the creator of the second MSRP link is the interworking function entity.

The process of the interworking function entity executing the protocol conversion on the received CPM message to send to the non-CPM system comprising: the interworking function entity receiving the CPM message, and converting the CPM message to the message conforming to the protocol format of the non-CPM system receiver to send to the non-CPM system;

the method further comprising: the interworking function entity sending the MSRP response message after receiving all the content of the large message mode CPM message, or the interworking function entity sending the MSRP response message after receiving the reception acknowledge message of the non-CPM system.

The method further comprises:

the CPM client sending session termination message, the session termination message being received by the originating participating function entity; the originating participating function entity receiving the session termination message and then sending the session termination message that is then received by the interworking selection function entity; the interworking selection function entity receiving the session termination message and then sending the session termination message that is then received by the interworking function entity; or the interworking function entity transmitting the content of the large message mode CPM message to the non-CPM system, and then sending session termination message which is then routed to the originating participating function entity through the interworking selection entity; the originating participating function entity receiving the session termination message and then sending the session termination message which is then received by the CPM client.

The interworking selection function entity is a Session Initiation Protocol (SIP) gateway;

the signaling plane of the interworking function entity is an SIP user proxy server.

A transmission system of CPM, used to send CPM message to non-CPM system by CPM client, comprising: a CPM client, a source participating function entity, an interworking selection function entity, an interworking function entity and a non-CPM system, wherein:

the CPM client is used to send, to a receiver of a large message, session invite message of the CPM message which carries session description protocol (SDP) session description parameters used for negotiation; and to send the CPM message to the originating participating function entity after building MSRP link with the source participating function entity;

the source participating function entity is used to receive the session invite message sent from the CPM client, build the MSRP link with the CPM client, and send the session invite message to the interworking selection function entity; and to build the MSRP link with the interworking function entity; and to receive the content of the large message mode CPM message sent from the CPM client and send the content of the large message mode CPM message to the interworking function entity;

the interworking selection function entity is used to receive the session invite message sent from the originating participating function entity, select the interworking function entity based on the condition carried in the received session invite message, and to send the session invite information to the interworking function entity;

the interworking function entity is used to receive the session invite message sent from the interworking selection function entity; and to build the MSRP link with the originating participating function entity; and to convert the large message mode CPM message received from the originating participating function entity to the message conforming to the protocol format of the non-CPM system to send to the non-CPM system.

In the present invention, the medium transmission link between the sender CPM client and the interworking function (IWF) is built through the session invite message of large message mode CPM message, the content of large message mode CPM message is sent to the IWF through the built medium transmission link, the large message CPM message is sent to non-CPM system by IWF, the content of large message mode CPM message is sent to receiver client after protocol conversion, this will solve the problem that the CPM client cannot send large message mode CPM message to non-CPM system user, and improve user experience meanwhile.

PREFERRED EMBODIMENTS OF THE PRESENT INVENTION

Figure 1:
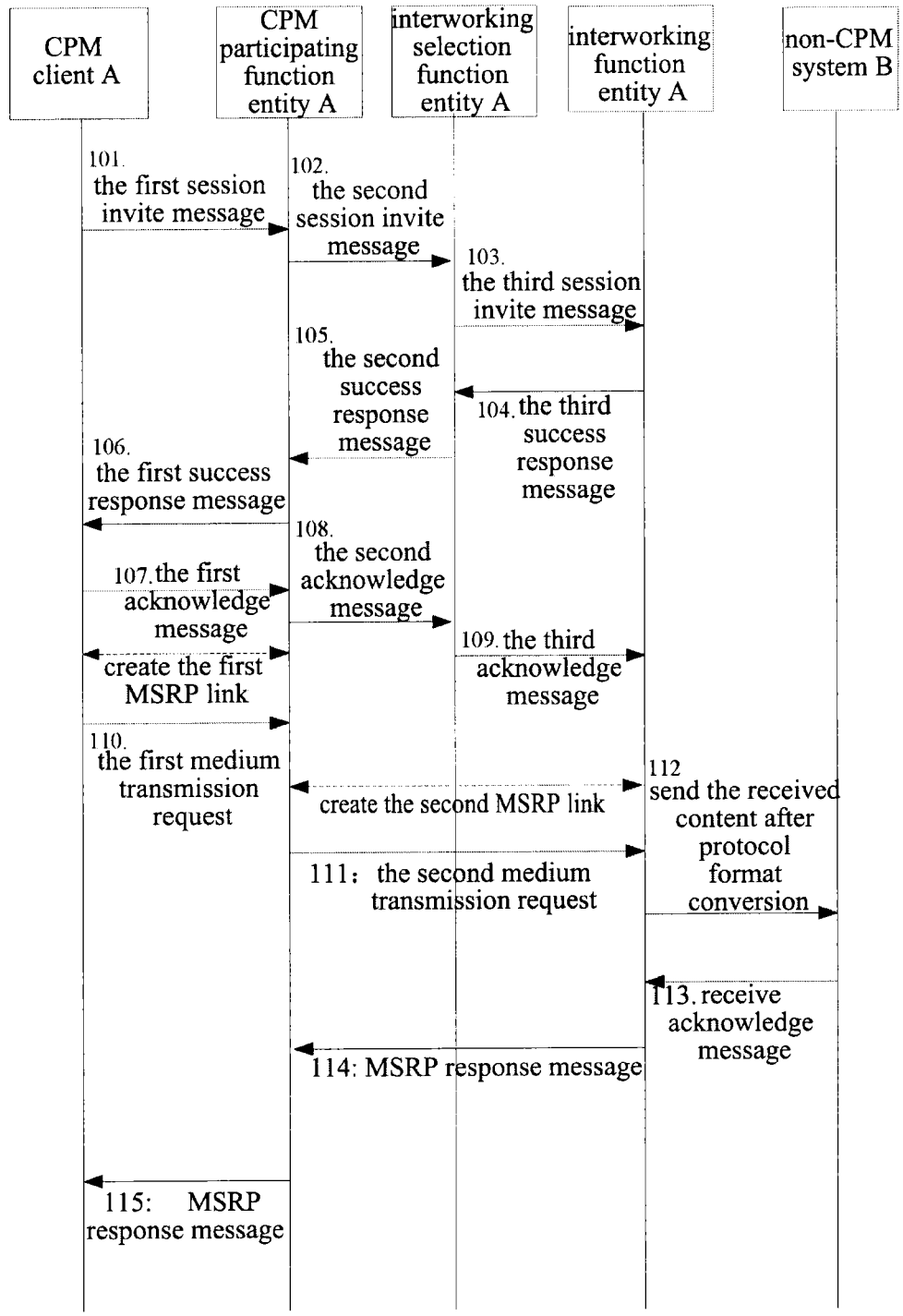
FIG. 1 is flowchart of the transmission method of large message mode CPM message provided by embodiments of present invention.

The present invention solves the problem that a CPM user cannot send large message mode CPM message to a non-CPM user, the relative function entities include: a CPM client (CPM sender and CPM receiver), a participating function entity (only originating participating function entity is involved) and an interworking function entity and an interworking function entity and a non-CPM system.

The large message mode CPM message may not be carried directly by SIP message due to large space occupied, the transmission routines of the large message mode CPM message are classified into signaling routine and medium routine, in other words, the signal is sent along the signal routine, the medium is sent along the medium routine, which is different from the pager-mode CPM message transmission way. Therefore, when the large message CPM message is sent to non-CPM system, in the present invention, the session invite message INVITE of large message mode CPM is used for SDP (Session Description Protocol) negotiation at first, and then the medium transmission link between the sender CPM client and the IWF is built. Through the built medium transmission link, the sender CPM client sends the content of the large message mode CPM message to IWF using Message Session Relay Protocol (MSRP), the IWF converts the format of the content of the large message mode CPM message to the format that complies with the non-CPM system to send to the non-CPM system, and then the non-CPM system sends them to the receiver client.

The large message mode CPM message referred in embodiments of the present invention is the CPM with size exceeding a preset threshold (1300 bytes, for example) according to the CPM specification enacted by OMA, said large message mode message could not be carried by SIP message.

The preferred embodiments of present invention will be described in combination with the accompanying figures, it should be appreciated that the preferred embodiments described herein are merely descriptive and explanatory and are not intended to limit the application.

According to embodiments of the present disclosure, a transmission method of large message mode CPM message is provided firstly which is applied in sending large message mode CPM message to receiver, specifically, the CPM client creates MSRP links respectively between the sender CPM client and the originating participating function entity and between the originating participating entity and the interworking function entity before sending the large message mode CPM message to the receiver of the non-CPM system, the creator of each MSRP link obtains the MSRP connection parameter/parameters of the opposite end through SDP negotiation and creates this MSRP link based on the MSRP link parameter/parameters; after that, the sender CPM client sends the content of the large message mode CPM message to the interworking function entity through each MSRP link, the content of the large message mode CPM message is sent to the non-CPM system after protocol conversion by the interworking function entity.

The above-mentioned MSRP connection parameter/parameters may be as follows: the connection parameter/parameters are IP address and port number; the connection parameter/parameters is URI parameter; the connection parameter/parameters are IP address, port number and URI parameter.

In the following embodiment, CPM Client A is the sender CPM client, participating function entity A is the originating participating function entity to which the sender belongs, the interworking selection function entity A, ISF in short, is the interworking selection function entity, interworking function entity A, IWF in short, is the interworking function entity, non-CPM system B is the selected non-CPM system (SMS system or MMS system or Email system is selected by ISF).

The present invention is described by embodiments as follows:

FIG. 1 shows the flowchart of the transmission method of large message mode CPM message provided by embodiments of the present invention, which includes the following steps of:

Step 101: the CPM client A sends a first SIP INVITE (session invite message), which carries SDP datagram used for session negotiation, of the large message mode CPM message, the SDP datagram carries the information of size and content type of the medium data to be transmitted. The first SIP INVITE message is routed to the participating function entity A through SIP/IP core network;

The SDP datagram in the first SIP INVITE may carry the MSRP connection parameters of CPM client A;

Step 102: the participating function entity A, as Back to Back User Agent (B2BUA), receives the first SIP INVITE message and processes the received message: determines that it is needed to send the message to non-CPM system based on the address of the receiver, and generates and sends a second SIP INVITE message which carries the SDP datagram used for session negotiation, wherein said SDP datagram keeps the information of size and content type of the first SIP INVITE message. The second SIP INVITE message is routed to the interworking selection function entity through the SIP/IP core network.

The SDP datagram of the second SIP INVITE message may carry the MSRP connection parameters of the participating function entity A;

Step 103: the interworking selection function entity A receives the second SIP INVITE message and then selects interworking function entity based on the parameters information carried in the message, such as content type, size; assuming the interworking function entity A is the selected interworking function entity, then a third SIP INVITE message is sent and routed to the interworking function entity A through SIP/IP core network.

The interworking selection function entity may be a SIP gateway which forwards the received SIP message, now the second SIP INVITE message and the third SIP INVITE message are the same in substance.

Step 104: the interworking function entity A receives the third SIP INVITE message, then generates and sends a third 200 OK message (success response message) which carries the acknowledgement SDP datagram used for session negotiation and is routed to the interworking selection function entity A through SIP/IP core network.

The SDP datagram in the third 200 OK message may carry the MSRP connection parameters of the interworking function entity A. The signaling plane of the interworking function entity may be regarded as SIP UAS (User Agent Server).

Step 105: the interworking selection function entity A receives the third 200 OK message, then sends a second 200 OK message which keeps SDP datagram in the third 200 OK message and is sent to the participating function entity A through the SIP/IP core network.

The interworking selection function entity may be regarded as SIP gateway and forwards the received SIP message, now the third 200 OK message and the second 200 OK message are the same in substance.

Step 106: the participating function entity A, as B2BUA, receives the second 200 OK message and processes the received message: generates and sends a first 2000K. The first 200 OK carrying the SDP datagram used for session negotiation is sent to the CPM client A through the SIP/IP core network.

The SDP datagram in the first 200 OK message may carry the MSRP connection parameters of participating function A.

Step 107: the CPM client A receives the first 200 OK message and sends a first SIP ACK message (acknowledgement message) which is sent to the participating function entity A through the SIP/IP core network.

In this step, the CPM client A may create a first MSRP link between the CPM client A and the participating function entity A based on the MSRP connection parameters of the participating function entity A.

Step 108: the participating function entity A receives the first SIP ACK message and then sends a second SIP ACK message which is routed to the interworking selection function entity A through the SIP/IP core network.

In this step, the participating function entity A may create a second MSRP link between the participating function entity A and the interworking function entity based on the MSRP connection parameters of the interworking function entity.

Step 109: the interworking selection function entity A receives the second SIP ACK message and then sends a third SIP ACK message which is routed to the interworking function entity A through the SIP/IP core network.

The interworking selection function entity may be regarded as SIP gateway, forwards the received SIP message, now the third ACK message and the second ACK message are the same in substance.

Step 110: the CPM client A sends the MSRP SEND request message through the first MSRP, the first MSRP SEND request message, which may include the MSRP connection parameters of the function entity required for creating the next link, is the MSRP SEND request message between the CPM client A and participating function entity A;

This step may be executed after the accomplishment of the creating of the first MSRP link.

Step 111: the participating function entity A relays the medium data in the received first MSRP SEND request message, that is to say, sends a second MSRP SEND request message which is the MSRP SEND between the participating function entity A and interworking function;

Step 112: the interworking function entity A, after receiving all the content of the large message mode CPM message sent from participating function entity A, converts the protocol format of the received content to the protocol format complying with the non-CPM system B to send to the non-CPM system B;

Step 113: the non-CPM system B receives the content sent from interworking function entity A with the protocol format being converted, and returns reception acknowledgement message to the interworking function entity;

Step 114: the interworking function entity A receives the acknowledgement message sent from the non-CPM system B, converts the protocol format of the acknowledgement message, generates and sends MSRP response message which is transmitted to the participating function entity A through the second MSRP link;

Step 115: the participating function entity A sends the reception acknowledgement message to the CPM client A through the first MSRP link.

When the transmission of all the content of the large message mode CPM message is done, the CPM client A receives the last MSRP acknowledgement message and sends the session termination message—SIP BYE message, which is routed to the participating function entity A through SIP/IP core network to indicate the termination of the large message mode CPM session, the participating function entity A receives said session termination message and then sends a session termination message which is routed to the interworking selection function entity A through the SIP/IP core network, and the interworking selection function entity A sends a session termination message which is routed to the interworking function entity A; alternatively, the interworking function entity A receives the reception acknowledgement message sent from the non-CPM system and then sends session termination message, the session termination message is routed to the participating function entity A through the SIP/IP core network and the interworking selection function entity, the participating function entity A receives the session termination message and then sends this session termination message which is then routed to the CPM client A through the SIP/IP core network.

In this embodiment, the second SIP ACK message is sent by the participating function entity A after the participating function entity A receives the first SIP ACK message, an additional explanation is that the participating function A may also send the second SIP ACK immediately after receiving the second 200 OK message, with no need to wait for the first SIP ACK to send the second SIP ACK;

in this embodiment, each network function entity (participating function entity A, for example) may send the SIP ACK message which is created by this network function entity, or it can forward directly the received SIP ACK message, there is no limit for that in present invention.

In this embodiment, the participating function entity A may also create the second MSRP link after receiving the second success response message 200 OK message;

in this embodiment, the creator of the first MSRP link may also be the participating function entity A, in this case the MSRP connection parameters of the CPM client A needs to be carried in the first SIP INVITE message, the participating function entity A may create the first MSRP link according to the MSRP connection parameters of the CPM client A after receiving the first SIP ACK.

The creator of the second MSRP link may also be the interworking function entity A, in this case the MSRP connection parameters of the participating function entity needs to be carried in the third SIP INVITE message, the interworking function entity A may create the second MSRP link according to the MSRP connection parameters of the participating function entity after receiving the third SIP ACK message.

In this embodiment, the second MSRP link may also be created after the participating function entity A receives the first MSRP SEND message, if the creator of the second MSRP link is the participating function entity A.

The way of creating of the above-mentioned first MSRP link and second MSRP link may be: the creator initiates a build link request according to the MSRP connection parameters of the opposite end, or selects an existing MSRP link with conformed host, port and/or MSRP URL (Universal Resource Identifier) as the local MSRP link.

In this embodiment, after the termination of the MSRP medium data transmission, the interworking function entity A may return MSRP response message in direction of the originating end along the medium transmission path immediately, or return the MSRP response message in direction of the originating end after the arriving of the acknowledge message from the CPM system, as described in this embodiment.

In this embodiment, the adjacent function entities inside the CPM system are inter-connected through the SIP/IP core network, that is to say, the SIP message (session invite message INVITE and success response message 200 OK, for example) of the signaling plane among the sender CPM client, originating participating function entity, interworking selection function entity and interworking function entity is routed to adjacent entity through the SIP/IP core network, in actual practice, all signaling message of the function entities may be routed to adjacent entity through the SIP/IP core network, or be routed through the SIP/IP core network between some function entities (the other function entities expect the ISF and IWF entities that are related to the interworking of the CPM system and the non-CPM system, for example), while the signaling message between the originating participating function entity and the ISF entity and the signaling message between the ISF entity and the IWF entity are sent directly between two entities, there is no limit for the processing in actual application in present invention.

A transmission system of large message mode COMP message is provided according to embodiments of the present invention. The system is used to send large message mode CPM message to a non-CPM user.

Figure 2:
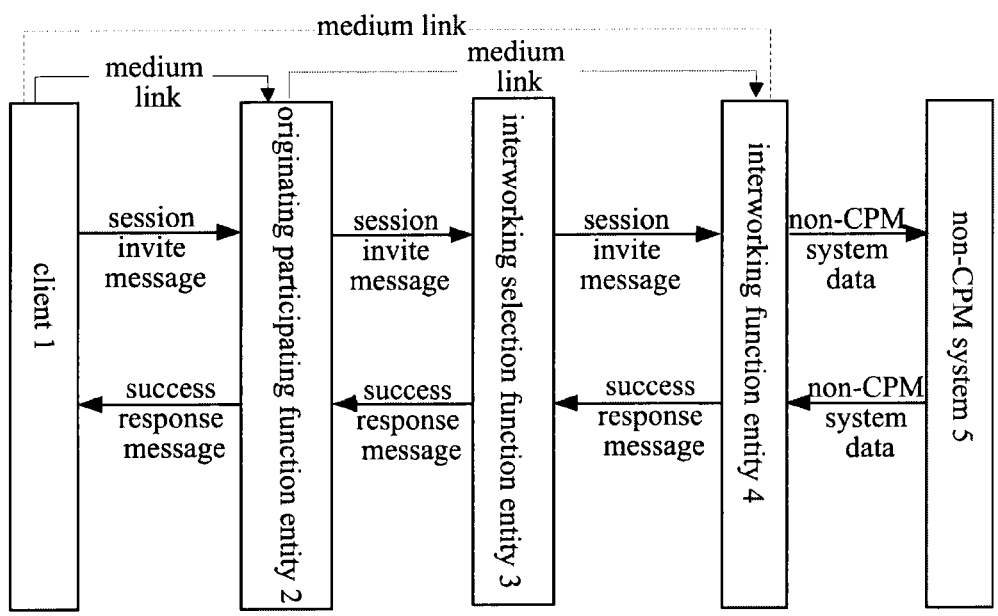
FIG. 2 is block diagram of transmission system of large message mode CPM message provided by embodiments of present invention.

As shown in FIG. 2, the transmission system of large message mode COMP message according to embodiments of the present invention includes: a sender CPM client 1, an originating participating function entity 2, an interworking function entity 3, an interworking function entity 4, a non-CPM system 5, wherein the sender CPM client is used to send session invite message of large message mode CPM, wherein the session description protocol (SDP) session description parameters used in negotiation are carried in the session invite message; the sender CPM client is also used to receive the success response message SIP 200 OK message of the session invite message; and the sender CPM client is also used to build medium transmission link between the originating participating function entities; and the sender CPM client is also used to send medium transmission request MSRP SEND message based on the built medium transmission link;

The originating participating function entity—the participating function entity to which the sender belongs—is used to receive the session invite message, and to receive and send the success response message SIP 200 OK, and to build medium transmission links with the sender CPM client and with the interworking function entity respectively, and to receive the medium transmission request MSRP SEND, and to send the medium transmission request message to an adjacent MSRP relay node;

The interworking selection function entity is used to receive and send the session invite message, and to receive and send the success response message SIP 200 OK; and to select interworking function entity according to the conditions carried in the session invite message.

The interworking function entity is used to receive the session invite message; and to generate and return the success response message SIP 200 OK of the session invite message; and to build the medium transmission link with the participating function entity; and to receive the medium transmission request MSRP SEND message; and to convert the protocol format of the content of the large message mode CPM message to the protocol format conforming to the non-CPM system to send to the non-CPM system.

As mentioned above, with regard to the receiver of the non-CPM system, by means of the technological schemes provided by the embodiment of the present invention, the transmission link between the sender and the IWF entity is built through the session invite message of large message mode CPM to send the content of the large message mode CPM message to the IWF, the content of the large message mode CPM message is forwarded to receiver non-CPM client by the IWF, the problem that the large message mode CPM message cannot be transmitted to receiver of non-CPM system in prior art is solved, and users experience is improved.

What we claim is:

1. A transmission method of converged IP messaging (CPM), comprising:

creating message session relay protocol (MSRP) links between a CPM client and an originating participating function (PF) entity and between an interworking function (IWF) entity and the originating PF entity, respectively;

the CPM client sending CPM message to the IWF entity through each MSRP link, the IWF entity executing a protocol conversion on received CPM message to send the message after conversion to a non-CPM system; wherein, a creating process of the MSRP link comprises:

a creator of the MSRP link obtaining MSRP connection parameters of an opposite end through an session description protocol (SDP) medium negotiation process, said creator creating the MSRP link according to the MSRP connection parameters; wherein, said SDP medium negotiation process comprises:

the CPM client sending first session invite message, which is received by the originating PF entity; the originating PF entity sending second session invite message, which is received by an interworking selection function (ISF) entity; the ISF entity selecting an IWF entity based on the second session invite message and sending third session invite message, which is received by the IWF entity;

the IWF entity sending third success response message, which is received by the ISF entity; the ISF entity sending second success response message, which is received by the originating PF entity; the originating PF entity sending first success response message, which is received by a sender CPM client, further comprising:
the CPM client receiving the first response message and then sending first acknowledge message, which is received by the originating PF entity; the originating PF entity receiving the first acknowledge message and then sending second acknowledge message, which is received by the ISF entity; the ISF entity receiving the second acknowledge message and then sending third acknowledge message, which is received by the IWF entity; or
the originating PF entity receiving the second success response message and then sending the second acknowledge message, which is received by the ISF entity; the sender CPM client receiving the first success response message and then sending the first acknowledge message, which is received by the originating PF entity.

2. The method according to claim 1, wherein:
the MSRP connection parameters of the CPM client are carried in the first session invite message; the originating PF entity creates a first MSRP link between the originating PF entity and the sender CPM client according to the MSRP connection parameters; or
the MSRP connection parameters of the originating PF entity are carried in the first success response message; the sender CPM client creates a first MSRP link between the CPM client and the originating PF entity according to the MSRP connection parameters of the originating PF entity.

3. The method according to claim 2, wherein:
the MSRP connection parameters of the originating PF entity are carried in the second session invite message and the third session invite message; the IWF entity creates a second MSRP link between the IWF entity and the originating PF entity according to the MSRP connection parameters; or
the MSRP connection parameters of the IWF entity are carried in the third success response message and the second success response message; the originating PF entity creates a second MSRP link between the originating PF entity and the IWF entity according to the MSRP connection parameters.

4. The method according to claim 3, wherein:
when the creator of the second MSRP link is the originating PF entity, the originating PF entity creates the second MSRP link after receiving the second success response message, or creates the second MSRP link after receiving the first acknowledge message, or creates the second MSRP link when receiving an MSRP medium transmission request;
the IWF entity receives the third acknowledge message and then creates the second MSRP link when the creator of the second MSRP link is the IWF entity.

5. The method according to claim 3, wherein:
the process of the IWF entity executing the protocol conversion on the received CPM message to send the message after conversion to the non-CPM system comprises: the IWF entity receiving the CPM message, and then converting the CPM message to content conforming to a protocol format of the non-CPM system receiver, and then to send the message after conversion to the non-CPM system;
the method further comprises: the IWF entity sending MSRP response message after receiving all content of large message mode CPM message, or the IWF entity sending the MSRP response message after receiving reception acknowledge message of the non-CPM system.

6. The method according to claim 4, wherein:
the process of the IWF entity executing the protocol conversion on the received CPM message to send the message after conversion to the non-CPM system comprises: the IWF entity receiving the CPM message, and then converting the CPM message to content conforming to a protocol format of the non-CPM system receiver, and then to send the message after conversion to the non-CPM system;
the method further comprises: the IWF entity sending MSRP response message after receiving all content of large message mode CPM message, or the IWF entity sending the MSRP response message after receiving reception acknowledge message of the non-CPM system.

7. The method according to claim 2, wherein:
the process of the IWF entity executing the protocol conversion on the received CPM message to send the message after conversion to the non-CPM system comprises: the IWF entity receiving the CPM message, and then converting the CPM message to content conforming to a protocol format of the non-CPM system receiver, and then to send the message after conversion to the non-CPM system;
the method further comprises: the IWF entity sending MSRP response message after receiving all content of large message mode CPM message, or the IWF entity sending the MSRP response message after receiving reception acknowledge message of the non-CPM system.

8. The method according to claim 2, wherein:
the CPM client receives the first success response message and then creates the first MSRP link when the creator of the first MSRP link is the CPM client;
the originating PF entity receives the first acknowledge message and then creates the first MSRP link when the creator of the first MSRP link is the originating PF entity.

9. The method according to claim 8, wherein:
the process of the IWF entity executing the protocol conversion on the received CPM message to send the message after conversion to the non-CPM system comprises: the IWF entity receiving the CPM message, and then converting the CPM message to content conforming to a protocol format of the non-CPM system receiver, and then to send the message after conversion to the non-CPM system;
the method further comprises: the IWF entity sending MSRP response message after receiving all content of large message mode CPM message, or the IWF entity sending the MSRP response message after receiving reception acknowledge message of the non-CPM system.

10. The method according to claim 1, wherein:
the process of the IWF entity executing the protocol conversion on the received CPM message to send the message after conversion to the non-CPM system comprises: the IWF entity receiving the CPM message, and then converting the CPM message to content conforming to a protocol format of the non-CPM system receiver, and then to send the message after conversion to the non-CPM system;
the method further comprises: the IWF entity sending MSRP response message after receiving all content of large message mode CPM message, or the IWF entity sending the MSRP response message after receiving reception acknowledge message of the non-CPM system.

11. The method according to claim 10, further comprising:
the CPM client sending session termination message, which is received by the originating PF entity; the originating PF entity receiving the session termination message and then sending session termination message, which is received by the ISF entity; the ISF entity receiving the session termination message and then sending session termination message, which is then received by the IWF entity; or the IWF entity transmitting the content of the large message mode CPM message to the non-CPM system, and then sending session termination message which is routed to the originating PF entity through the ISF entity; the originating PF entity receiving the session termination message and then sending session termination message, which is then received by the CPM client.

12. The method according to claim 11, wherein:
the ISF entity is a Session Initiation Protocol (SIP) gateway;
a signaling plane of the IWF entity is a SIP user proxy server.

13. A converged IP messaging (CPM) transmission system, used to send CPM message to a non-CPM system by a CPM client, comprising: a CPM client, a participating function (PF) entity, an interworking selection function (ISF) entity, an interworking function (IWF) entity and a non-CPM system, wherein:

the CPM client is used to send, to a receiver of a large message, session invite message of the CPM message which carries session description protocol (SDP) session description parameters used for negotiation; and to send the CPM message to the originating PF entity after building an MSRP link with the PF entity;

the PF entity is used to receive the session invite message sent from the CPM client, build the MSRP link with the CPM client, and send the session invite message to the ISF entity; and to build the MSRP link with the IWF entity; and to receive content of large message mode CPM message sent from the CPM client and send the content of the large message mode CPM message to the IWF entity;

the ISF entity is used to receive the session invite message sent by the originating PF entity, select the IWF entity based on a condition carried in the received session invite message, and to send the session invite information to the IWF entity;

the IWF entity is used to receive the session invite message sent by the ISF entity; and to build the MSRP link with the originating PF entity; and to convert the large message mode CPM message received from the originating PF entity to the message conforming to a protocol format of the non-CPM system, and then to send the message after conversion to the non-CPM system further comprising:

the CPM client receiving the first response message and then sending first acknowledge message, which is received by the originating PF entity; the originating PF entity receiving the first acknowledge message and then sending second acknowledge message, which is received by the ISF entity; the ISF entity receiving the second acknowledge message and then sending third acknowledge message, which is received by the IWF entity; or the originating PF entity receiving the second success response message and then sending the second acknowledge message, which is received by the ISF entity; the sender CPM client receiving the first success response message and then sending the first acknowledge message, which is received by the originating PF entity.

14. The method according to claim 13, wherein:
the process of the IWF entity executing the protocol conversion on the received CPM message to send the message after conversion to the non-CPM system comprises: the IWF entity receiving the CPM message, and then converting the CPM message to content conforming to a protocol format of the non-CPM system receiver, and then to send the message after conversion to the non-CPM system;

the method further comprises: the IWF entity sending MSRP response message after receiving all content of large message mode CPM message, or the IWF entity sending the MSRP response message after receiving reception acknowledge message of the non-CPM system.

\* \* \* \* \*